July 6, 1926.  
H. A. MYERS  
1,591,179  
PROCESS OF AND APPARATUS FOR MAKING SHEET GLASS AND OTHER ARTICLES  
Filed July 26, 1920  
2 Sheets-Sheet 1
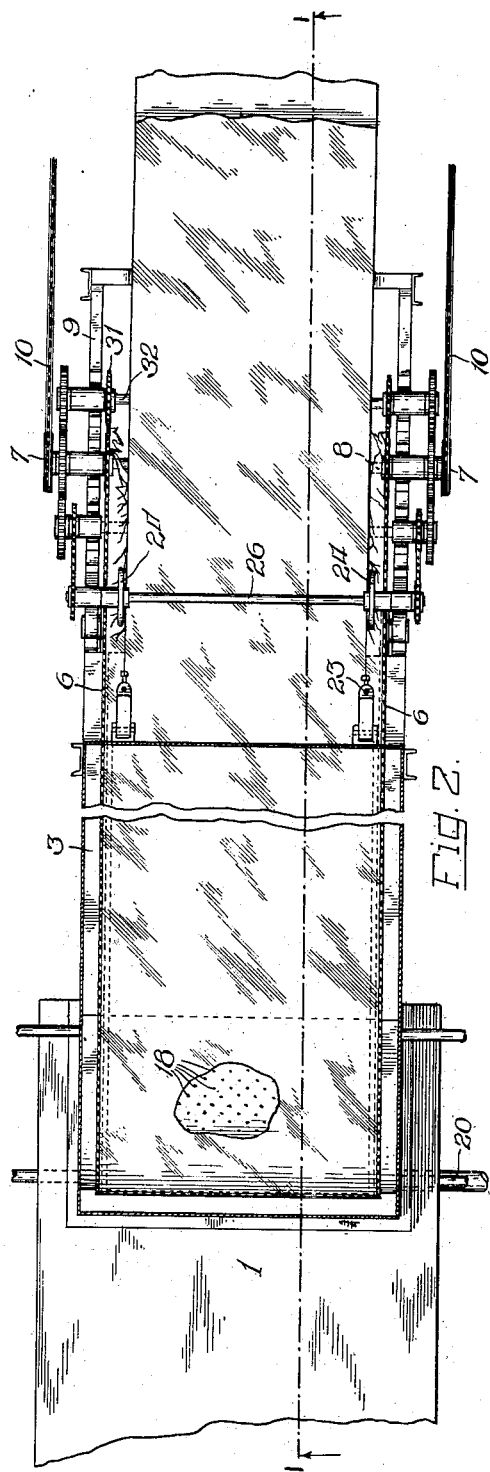
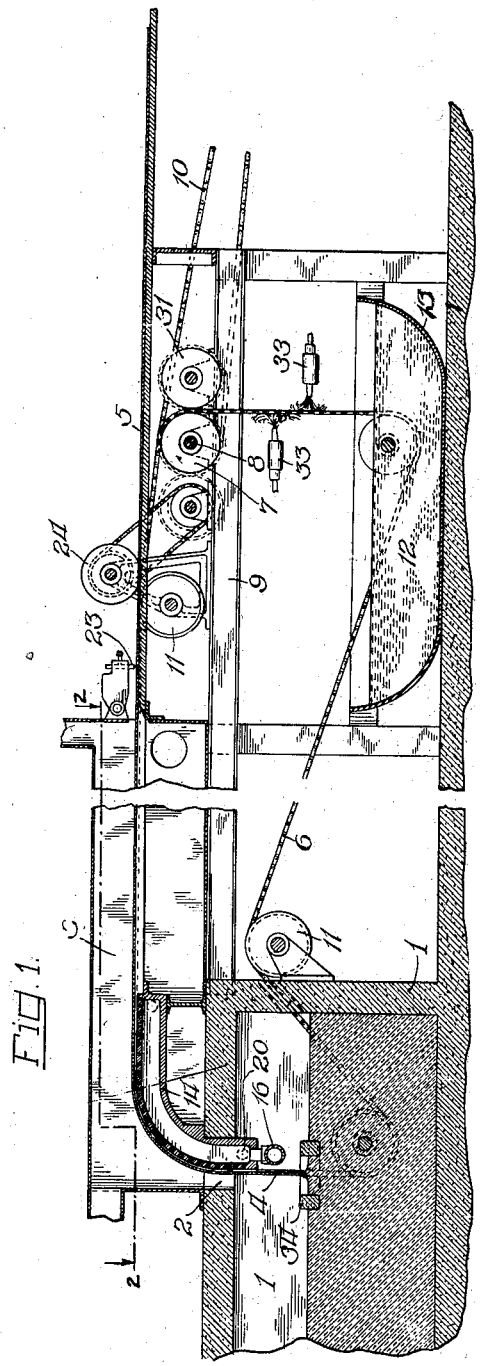
INVENTOR  
Hubert A. Myers.  
By Arthur H. Howard  
atty July 6, 1926.
H. A. MYERS
1,591,179
PROCESS OF AND APPARATUS FOR MAKING SHEET GLASS AND OTHER ARTICLES
Filed July 26, 1920     2 Sheets-Sheet 2
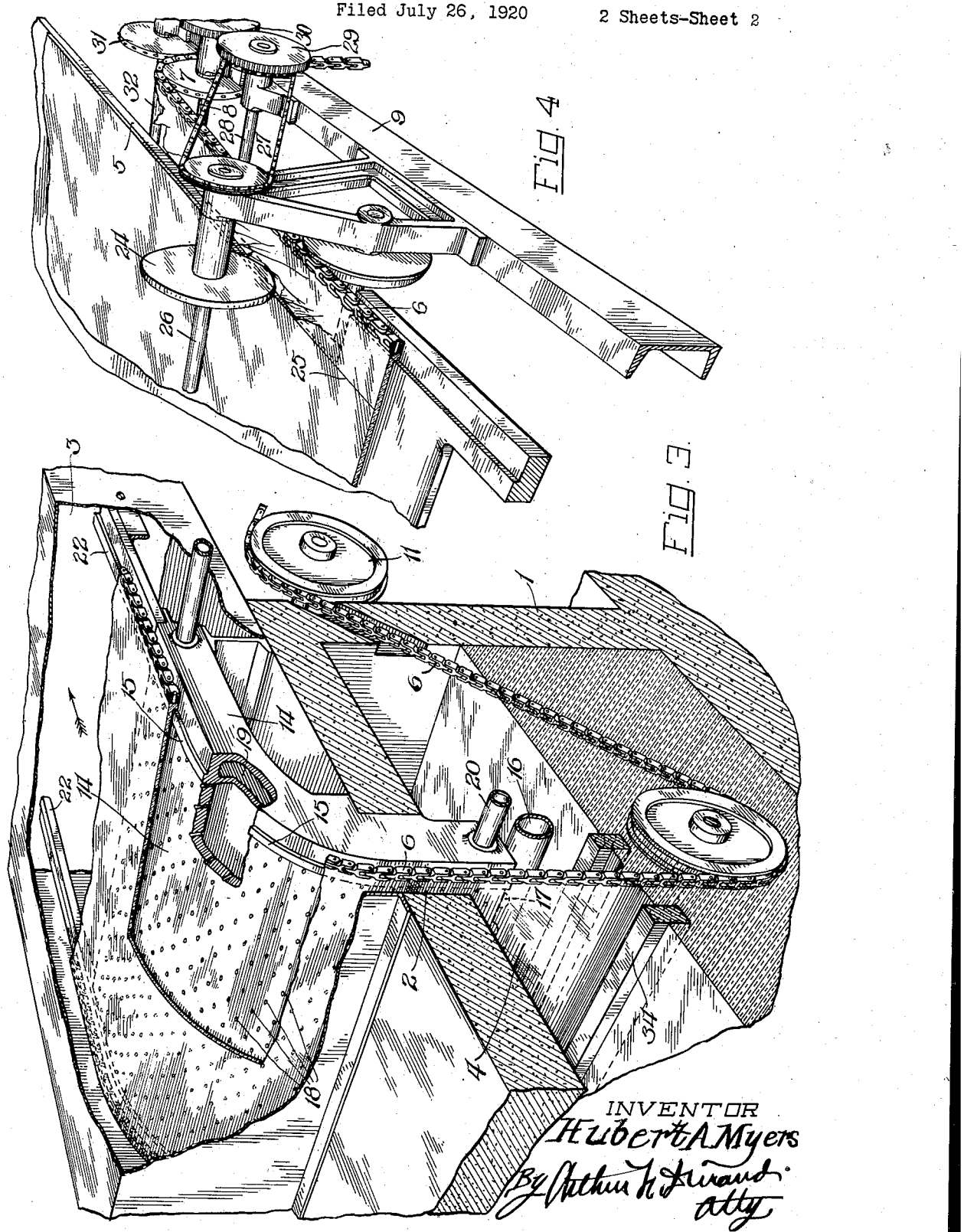
INVENTOR
Hubert A. Myers
By Arthur H. Girand
Atty Patented July 6, 1926.

1,591,179

UNITED STATES PATENT OFFICE.

HUBERT A. MYERS, OF TOLEDO, OHIO.

PROCESS OF AND APPARATUS FOR MAKING SHEET GLASS AND OTHER ARTICLES.

Application filed July 26, 1920. Serial No. 399,163.

This invention relates particularly to the drawing of sheet glass upward a distance from the bath of molten glass and then changing its course of draw while still in a soft pliant state.

In the drawing of sheet glass in this manner it has been the practice to change the course of travel or draw of the sheet by passing it over a guiding agent of a tangible nature such, for instance, as a "bending roll". The use of guiding or sheet bending means of this character is objectionable, however, due to the marring action which it has on the sheet, and it is the primary object of this invention to guide and direct the angled course of movement of the sheet in such manner as to prevent any injury to the soft smooth surface thereof as its course of movement is changed and at the same time guide the sheet in a simple and efficient manner.

Other objects and advantages of the invention will be apparent from the following description thereof.

The invention is fully described in the following specification, and while, in its broader aspect, it is capable of embodiment in numerous forms, one embodiment only thereof is illustrated in the accompanying drawings, in which,—

Figure 1 is a vertical longitudinal section through the portion of a sheet glass drawing apparatus embodying the invention, with parts broken away, the section being taken on the line 1—1 in Fig. 2. Fig. 2 is a top plan view thereof with a portion in horizontal section on the line 2—2 in Fig. 1. Fig. 3 is an enlarged perspective elevation of the portion of the apparatus which guides the changing course of movement of the sheet, with portions broken away and in section, and Fig. 4 is a similar enlarged elevation of the sheet edge trimming means of the apparatus.

Referring to the drawings, 1 designates a tank containing molten glass from which the glass sheet is drawn, the glass being supplied to the tank from a communicating furnace or other suitable source of supply, as is well understood in the art. The top of the tank is preferably closed except for an opening 2 therein in communication with the entrance end of a leer or annealing chamber 3, the glass sheet 4 being drawn upward from the molten glass in the tank 1 through the opening 2 into the leer 3 and has its course of movement changed to horizontal as it enters the leer so that its drawing is continued lengthwise of the leer and from the rear or outlet end thereof. The sheet preferably after leaving the leer, or after becoming sufficiently set so that contact with a tangible supporting means will not injure the surface thereof, passes over a supporting table 5 to any suitable point.

The drawing of the sheet is accomplished, in the present instance, by a pair of endless chains 6, 6 one at each edge of the sheet, and these chains are guided to pass upward through the molten glass in the tank 1 at the respective edges of the sheet being drawn and to take the course of the sheet through the leer and a distance over the table 5. The chains are driven by sprocket wheels 7, 7 at the respective ends of the cross-shaft 8 journaled in the supporting frame 9 below the table 5, and this shaft has a chain and sprocket wheel drive 10 at each end, or may be driven in any other suitable manner. Each chain 6 is guided at suitable points by guide wheels 11 so as to direct the chain into a cold water bath 12 disposed in a tank 13 below the table 5 and also to direct the course of the chain upward through the molten bath in the tank 1. The drawings show a pair of guide wheels 11 as disposed within the molten bath. In practice, however, these wheels should be disposed below the tank 1 so that they will not be subjected to the action of the molten glass.

At the point of changing of the course of movement of the sheet from a vertical to substantially a horizontal it passes over a hollow shoe 14, which is of greater width than the sheet being drawn and has its outer sheet guiding side formed with a gradual curve to impart the desired change to the course of movement of the sheet. This shoe also assists in guiding the course of movement of each drawing chain 6 which passes up over the adjacent end edge thereof, and the shoe, in the present instance, extends up through the opening 2 into the leer 3 where it curves to a horizontal. The direction of movement of the two chains is upward through the molten bath and into the leer 3, over the guide shoe 14, and thence rearward through the leer and over the forward portion of the table 5 so that a continuous sheet of glass is drawn upward by the chains over the guide shoe and through the leer. The shoe is provided at its outer side near each side edge thereof with a ledge or rib 15 adjacent to the inner edge of the respective chain 6, and adapted to support the sheet of glass being drawn above the surface of the guide shoe which is intermediate the ribs. Preheated air under pressure is introduced in the hollow of the shoe from any suitable source of supply through a pipe 16, which is in communication through a plurality of small pipes 17 with the bottom portion of the shoe, and such air is discharged from the shoe through the outer sheet guiding surface thereof intermediate the ribs 15 through perforations 18 so that a film of air or a fluid blast is maintained between the shoe and the sheet being drawn to facilitate the guiding movement of the sheet over the shoe and to tend to floatingly support the sheet relative to the shoe, except at the edges of the sheet where it has contact with the supporting ribs 15. The sheet is thereby prevented from having marring contact with the guiding means except at the edge portions thereof, which edge portions are later removed. The shoe is provided at both side edges with a cooling compartment 19, the cooling fluid for which enters the lower end of each compartment through pipes 20 and has its exit from the compartment through the pipes 21 at the upper end thereof. The purpose of these cooling compartments is to cool the edge portions of the sheet adjacent to the chains to form a bead thereon for riding on the ribs 15 while the portion of the sheet intermediate the ribs remains in a more pliant condition.

The sheet at its edges and the drawing chains after leaving the shoe 14 are guided and supported in their travel rearward through the leer by edge strips 22 extending between the rear edge of the shoe and the forward end of the table 5 so that the sheet has both surfaces thereof intermediate the guide strips 22 exposed to the tempering heat within the leer. The sheet is sufficiently set by the time it passes from the shoe 14 as to prevent a sagging thereof between the supporting strips. The table 5 may be made of any desired length to take care of the sheet as it feeds from the leer, and at a point a distance from the leer the table is narrowed to a width equal to the desired width of the glass sheet to permit a downward breaking from the sheet of the selvage edge portions thereof. The sheet as it emerges from the leer is scored or cut longitudinally thereof adjacent to each edge by a pair of diamond points or other suitable cutters 23, which register longitudinally with the narrowed edges of the table and are carried by holders that are pivoted to the front end of the leer, thereby adapting the cutters to rest by gravity on the sheet.

Breaking wheels 24 extend at their lower edges below the level of the table 5 at the opposite side edges thereof so that the edge portions of the sheet without the scored lines 25 are broken from the sheet as they pass under the wheels, as illustrated in Fig. 4. This breaking action is also facilitated by a downward declining of the draw chains 6 from a point near the breaking wheels 24 and thence rearward to the drive sprockets 7. The breaking wheels 24 are carried by a shaft 26, each end of which, in the present instance, is in chain and sprocket wheel connection 27 with a cross-shaft 28 that is connected to and driven from the shaft 8 by gears 29 and 30 at the ends thereof. The glass which clings to the chains 6 is crushed therefrom by crushing rolls 31 of the sprocket wheel type, which are carried by a cross-shaft 32 and engage the respective chains in opposition to the sprocket wheels 7. Should any glass adhere to the chains after passing downward from the crushing roll 31 it will be heated by the flames from burners 33 before entering the cold water bath 12, which will cause the glass to be suddenly chilled and break off from the chains. The glass which is severed from the edges of the sheet and is broken off from the chains drops into the vat 13 and can be removed at intervals therefrom in any suitable manner.

34 designates a float which encircles the sheet at its point of drawing from the molten mass of glass in the tank 1 and keeps bubbles or any scum on the top of the molten glass from being drawn out with the sheet in the drawing process as is well understood in the art.

A drawing of a sheet is first started by lowering a bait into the molten glass and then drawing it up with the glass in sheet form adhering thereto, such upward drawing being at the same speed as the speed of the chains 6 to which the side edges of the sheet adhere. When the glass at the point of attachment of the bait therewith has cooled sufficiently to maintain its shape the bait is broken therefrom and the set portion of the glass then continues to act as the bait intermediate the chains. The glass as it is drawn up over the bending shoe 14 is subjected at its under side to a current of heated air which air is confined at the sides of the shoe by the ribs 15 and can only flow from the spaces between the shoe and glass at the ends of the shoe, thereby forming a film of air between the glass and shoe which makes a perfect fluid bearing for the sheet to ride on while making the turn from vertical to horizontal and prevents a marring contact of the sheet with the shoe or guiding means. The edge portions of the sheet at the same time are cooled a greater extent than the body portion of the sheet so as to more firmly affix the chains thereto and also to render the glass sufficiently firm to enable it to be drawn over the ribs 15. The sheet after leaving the shoe 14 passes rearward through the leer and thence over the supporting table 5 where its edges are trimmed off by the cooperating action of the cutters 23 and breaking off wheels 24 and also by reason of the slight downward deflecting of the draw chains 6 from the plane of travel of the sheet. The glass which adheres to the chains is crushed therefrom to a large extent by the passage of the chains between the coacting crushing rolls or sprocket wheels 7 and 31 and the remaining glass which adheres to the chains is removed therefrom by raising the temperature thereof by the burners 33 and then suddenly chilling the glass by submerging it in the cold water bath 12.

It is evident that I have provided simple and efficient means of a pneumatic character for assisting in guiding the sheet from vertical to horizontal position, or substantially so, while in a soft pliant condition thereby avoiding the marring of the soft surface of the sheet which would be present if brought in contact with a tangible bending means. It is also evident that I have provided simple means for drawing the sheet and trimming from the sheet the edge portions thereof which adhere to the drawing means. The sheet as it continuously feeds from the leer over the table 5 may be cut into sections of desired length and removed from the table.

I wish it understood that my method of drawing sheet glass is not limited to that specifically described or to being practiced by the use of any particular apparatus, and also that the apparatus illustrated and described may be changed and modified in numerous respects without departing from the spirit of the claims.

From the foregoing it will be seen that the sheet is drawn continuously from a source of supply, such as the mass of molten glass shown and described, and that it gradually changes its course or the direction of travel from a vertical plane to a horizontal plane in a manner that prevents breaking of the sheet. While thus changing its direction of travel, and at the point where it is thus latterly deflected, the sheet is supported by fluid under pressure, which fluid is heated to prevent chilling of the glass, and whereby the under surface of the sheet is prevented from dragging on the shoe through the small openings of which the heated air or other fluid is supplied to the thin space maintained between the sheet and the surface of the shoe, between the ribs or supporting portions 15 of the shoe, so that contact between the glass and other objects is prevented to avoid injury to the surface thereof.

As shown and described, the process or method and the apparatus are employed in the manufacture of sheet glass, but it will be understood that glass articles of any suitable or desired shape can be made without departing from the spirit of the invention, by floating the article on a cushion of heated air or other fluid, or by using fluid under pressure to maintain the glass article, while soft and pliable, in the desired position thereof and to prevent scratching or injury to the surface of the glass.

What I claim as my invention is:

1. The process of making sheet glass, comprising the drawing of a sheet from a supply of molten glass, deflecting the sheet to change its course of travel, while maintaining therefor a perfectly level and highly polished surface, and supplying a fluid to support the sheet and keep it pliable at the point of deflection therein, in which said fluid is air preheated to prevent chilling of the glass.

2. The process of making a glass article, which comprises the formation of the molten glass into the desired shape, then causing it to travel and remain pliable while supported upon a cushion formed by fluid under pressure, while maintaining therefor a perfectly level and highly polished surface, said fluid being air preheated to a temperature to prevent injurious cooling of the glass while passing over said cushion.

3. The process of making sheet glass, which comprises the floating of the sheet of soft pliable glass on a cushion of preheated air to prevent contact of the glass with anything which might injure the surface thereof.

4. The process of making sheet glass, which comprises the continuous formation of a sheet from a supply of molten glass so that the sheet may travel continuously therefrom until the said supply is exhausted, while maintaining therefor a perfectly level and highly polished surface, and chilling the sheet after it has traveled a distance from the source of supply, including the floating of the sheet on a cushion of preheated air at a point between the source of supply and the area where the sheet is cooled, thereby to prevent injury to the surface of the glass.

5. In apparatus for making sheet glass, the combination of means for supplying the molten glass, means for drawing a sheet from the mass of molten glass, means for deflecting the direction of travel of the sheet from a vertical plane to a horizontal plane, a shoe over which the glass travels from one plane to the other, and means for interposing a preheated fluid between the glass and the surface of said shoe, thereby to prevent the sheet of soft glass from dragging on the shoe, thus avoiding injury to the surface of the glass.

6. A structure, as specified in claim 5, the said means for drawing the sheet of glass comprising endless sprocket chains which travel downwardly into the mass of molten glass and then upwardly therefrom, the upwardly moving portions of the two sprocket chains carrying the sheet between them, and said shoe having portions over which the two sprocket chains travel to change the direction of travel of the sheet of glass.

7. A structure as specified in claim 5, in combination with means for chilling the marginal portions of the sheet of glass, while maintaining the body portion thereof at a higher temperature, and means thereafter to trim the marginal portions from the sheet.

8. A structure, as specified in claim 5, in which said shoe has cool end portions which form the supports for the sprocket chains.

9. A structure, as specified in claim 5, said shoe having parallel raised portions to engage the marginal portions of the sheet and having a plurality of small openings to supply the air to the space between the shoe and the under surface of the glass.

10. A structure, as specified in claim 5, said shoe being curved in a manner to prevent breaking of the glass, so that the sheet will curve gradually from one plane to the other.

11. A structure, as specified in claim 5, said means for drawing the sheet from the mass of molten glass comprising endless sprocket chains, in combination with means for cleaning the chilled glass from said sprocket chains, and means for chilling the cleaned portions of the sprocket chains before they again enter the mass of molten glass.

HUBERT A. MYERS.